(12) United States Patent
Chou

(10) Patent No.: US 6,850,602 B1
(45) Date of Patent: Feb. 1, 2005

(54) METHOD AND APPARATUS FOR ANSWERING MACHINE DETECTION IN AUTOMATIC DIALING

(75) Inventor: Wu Chou, Basking Ridge, NJ (US)

(73) Assignee: Avaya Technology Corp., Basking Ridge, NJ (US)

(*) Notice: Subject to any disclaimer, the term of this patent is extended or adjusted under 35 U.S.C. 154(b) by 123 days.

(21) Appl. No.: 10/107,963

(22) Filed: Mar. 27, 2002

(51) Int. Cl.[7] .............................................. H04M 1/64
(52) U.S. Cl. ...................................... 379/80; 379/88.07
(58) Field of Search ............................ 379/67.1, 70, 79, 379/80, 88.01, 88.07, 62.1

(56) References Cited

U.S. PATENT DOCUMENTS

| | | | | |
|---|---|---|---|---|
| 4,941,168 A | * | 7/1990 | Kelly, Jr. ...................... 379/69 |
| 4,979,214 A | * | 12/1990 | Hamilton ...................... 704/233 |
| 5,371,787 A | * | 12/1994 | Hamilton ...................... 379/386 |
| 5,430,792 A | * | 7/1995 | Jesurum et al. ............ 379/88.01 |
| 5,467,391 A | | 11/1995 | Donaghue, Jr. et al. |
| 5,533,103 A | * | 7/1996 | Peavey et al. ................. 379/69 |
| 5,570,419 A | | 10/1996 | Cave et al. |
| 5,586,179 A | | 12/1996 | Stent et al. |
| 5,638,424 A | * | 6/1997 | Denio et al. ............... 379/88.18 |
| 5,724,420 A | * | 3/1998 | Torgrim ....................... 379/372 |
| 5,946,656 A | | 8/1999 | Rahim et al. |
| 5,982,857 A | * | 11/1999 | Brady ....................... 379/88.19 |
| 6,041,116 A | * | 3/2000 | Meyers ........................ 379/244 |
| 6,208,970 B1 | * | 3/2001 | Ramanan ..................... 704/270 |
| 6,230,122 B1 | | 5/2001 | Wu et al. |
| 6,269,153 B1 | | 7/2001 | Carpenter et al. |
| 6,281,926 B1 | * | 8/2001 | Allen et al. ............... 348/14.06 |
| 6,327,564 B1 | | 12/2001 | Gelin et al. |
| 6,470,077 B1 | * | 10/2002 | Chan ........................ 379/88.01 |
| 2001/0017913 A1 | * | 8/2001 | Tuttle ........................ 379/88.1 |
| 2001/0028310 A1 | * | 10/2001 | Tuttle ......................... 340/601 |
| 2002/0001369 A1 | * | 1/2002 | Merwin et al. ............. 379/67.1 |
| 2002/0085686 A1 | * | 7/2002 | Cullis ......................... 379/67.1 |
| 2003/0086444 A1 | * | 5/2003 | Randmaa et al. ........... 370/526 |
| 2003/0086541 A1 | * | 5/2003 | Brown et al. ............. 379/88.01 |
| 2003/0088403 A1 | * | 5/2003 | Chan et al. .................. 704/213 |

OTHER PUBLICATIONS

Qi Li, et al., "A Robust, Real–Time Endpint Detector with Energy Normalization for ASR in Adverst Environements", Proc. ICASSP'01 (International Conference on Acoustic, Speech and Signal Processing), vol. 1, Salt Lake City, 2001.

C.H. Lee, et al. "A Study on Natural Language Call Routing", Speech Communication, vol. 31, (4), pp 309–320, 2000.

W. Chou, et al. "Natural Language Call Steering for Service Applications", Proc. ICSSLP'00. (International Conference on Speech and Language Processing), vol. IV, Beijing, 2000.

* cited by examiner

*Primary Examiner*—Scott L. Weaver
(74) *Attorney, Agent, or Firm*—Ryan, Mason & Lewis, LLP

(57) ABSTRACT

In a communications network, systems and methods using a feature other than a tone for detecting if the destination is a machine are described. An exemplary method includes the following steps: establishing a communication with a destination, detecting a response, if a response is not detected within a pre-determined time interval, determining that the destination is a machine. If a response is detected, the method further includes the following steps: determining whether the response includes a speech signal that includes a predefined term (e.g., "please leave a message"), and if it does, determining that the destination is a machine. If the response does not include a predefined term, the method may send out a query to the destination and if no response to the query is received or the response is not a speech signal, the method determines that the destination is a machine.

33 Claims, 12 Drawing Sheets

400

500

|  | | MACHINE | LIVE PERSON |
|---|---|---|---|
| R1 | LEAVE | 60 | 0 |
| R2 | LEAVE, MESSAGE | 54 | 0 |
| R3 | MESSAGE | 70 | 0 |
| R4 | HELLO | 1 | 80 |
| R5 | SPEAKING | 0 | 85 |
| R6 | HOME | 75 | 5 |

600

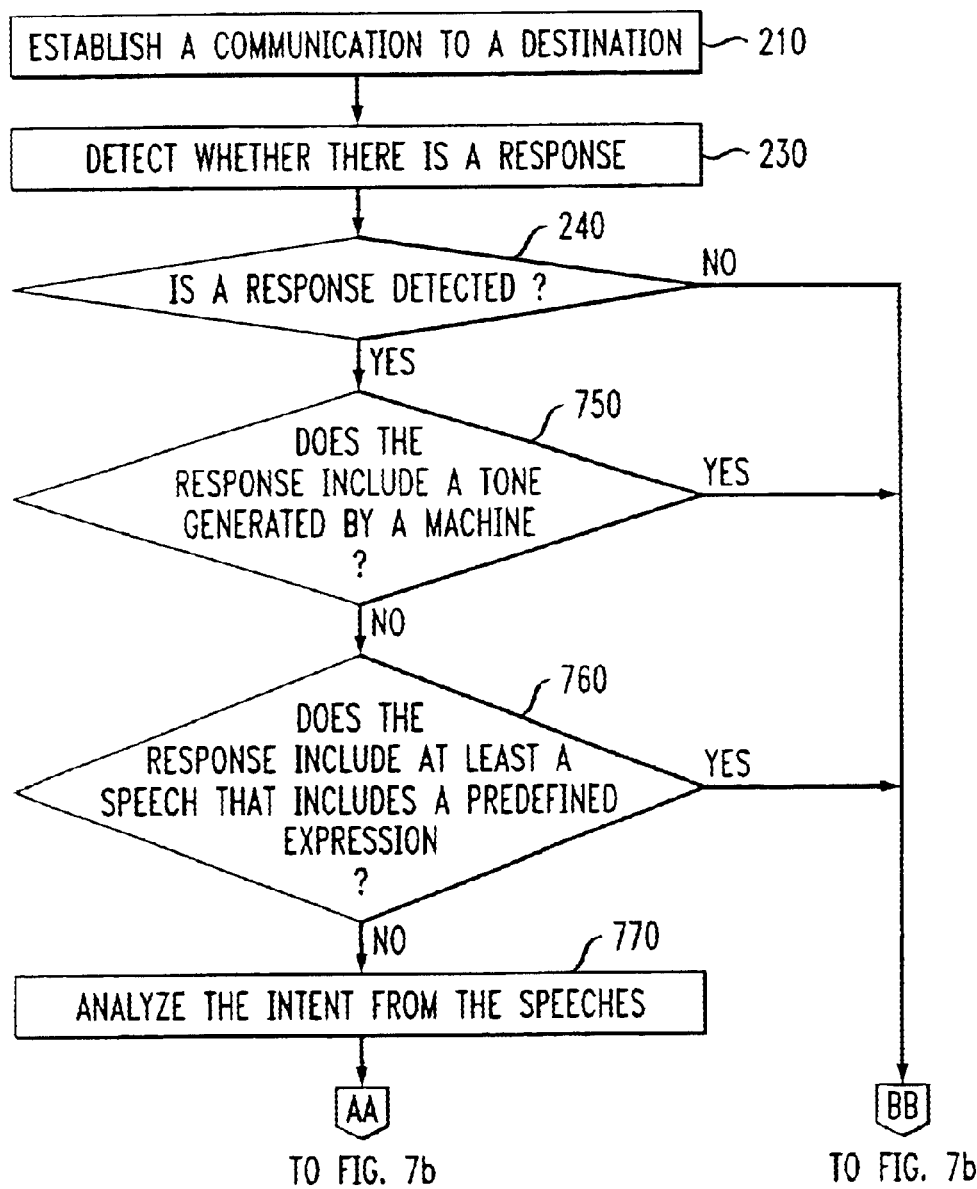

METHOD AND APPARATUS FOR ANSWERING MACHINE DETECTION IN AUTOMATIC DIALING

TECHNICAL FIELD

The present invention relates to communication systems, and more specifically to automatic dialing systems.

BACKGROUND OF THE INVENTION

Automatic telephone dialing systems, such as the MOSAIX PREDICTIVE DIALING SYSTEMS offered by AVAYA INC., Basking Ridge, N.J., are widely used at customer call centers. The SYSTEMS are also used at other businesses to automate outbound contacts for collections, telemarketing campaigns and proactive customer services. For applications such as telemarketing campaigns, automatic dialing systems may be coupled with interactive voice response ("IVR") systems such as AVAYA's INTUITY™ CONVERSANT® SYSTEM. An IVR system, generally, presents recorded voice information to the outbound contact ("called party" or "destination"). The IVR system may also elicit voice information from the destination in order to complete a transaction. If, however, the IVR system for any reason cannot complete a transaction, it may transfer the destination to a live agent better equipped to serve the destination. In the event that the automatic dialing system reaches an answering system rather than a live person answering the call, it would be desirable to disengage the IVR system and terminate the call.

One approach for addressing this need employs a tone based detection scheme, commonly found in current IVR systems. This scheme allows an IVR system to listen for a special tone generated by a machine such as an answering machine. This tone usually has high energy concentration on a narrow band of frequencies, for example, one or two frequencies, in the range from 1 KHz to 2 KHz. Generally, when the tone is detected, the IVR system determines that the destination is a machine, halts the communication and instructs the automatic dialing system to terminate the call.

A disadvantage of this approach is that some answering machines do not generate a special tone. Furthermore, tone based interface is not a standard, and the tone has often been replaced by more user friendly interfaces selected or designed to fit each individual's liking. Consequently, when the interface changes, an IVR system may falsely identify the destination as not a machine. With that false identification, the IVR, generally, continues to hold the call or transfers the call to a live agent resulting in inefficient use of the IVR resources or the live agent.

SUMMARY OF THE INVENTION

A system and method according to the principles of the invention is provided for determining whether the destination is a machine. Specifically, after the communication has been established and a response has been received, at least a feature other than a tone is detected to determine whether the destination is a machine.

One of the key observations that this invention is based upon is that no matter how the interface changes nor how high the fidelity is in the recorded message, unlike human, an answering machine is not capable to engage in a meaningful dialogue. In accordance with this aspect of the invention, a system or method according to the principles of invention sends a query for engaging a dialog with the destination after the communication has been established. If a response is not detected within a pre-determined time interval or the response does not include a speech signal, the system or method determines that the destination is a machine.

In accordance with another aspect of the invention, a system or method according to the principles of invention detects a response from the destination after the communication has been established. If no response is detected within a pre-determined time interval or the response includes a speech signal that includes a pre-defined term (such as "leave a message"), the destination is determined as a machine.

In accordance with yet another aspect of the invention, a system or method detects a response from the destination after the communication has been established. If the response includes a speech signal, the system or method analyzes the content of the speech signal to determine if the destination is a machine.

In accordance with yet another aspect of the invention, two or more of the: above three methods are combined for detecting whether a destination is a machine.

In accordance with yet another aspect of the invention, the system or method detects whether there is a tone from the destination after the communication has been established. If the tone is not detected, one or more of the above methods are used to determine whether the destination is a machine.

An embodiment according to the principles of the invention is a system that comprises an automatic dialer, a communication server, a dialog engine, a response detector, and a classifier. The automatic dialer retrieves the next destination to be reached with the associated dial number from a database and the communication server, then, establishes a communication with the destination using the dial number retrieved by the automatic dialer. After the communication has been established, the dialog engine waits until there are no signals coming from the destination and sends out a query that invites an oral response from the destination. After the query has been sent, the response detector detects whether there is a response from the destination within a pre-determined time interval. If a response is detected, the classifier determines whether the response includes a speech signal. If no response is detected or a response is detected but does not include a speech signal, the system determines that the destination is a machine and instructs the communication server to terminate the communication. Otherwise, the system instructs the communication server to forward the communication to a live agent.

Another embodiment is a method for detecting if the destination is a machine. The method includes the following steps: establishing a communication with a destination, detecting a response, if a response is not detected within a pre-determined time interval, determining that the destination is a machine. If a response is detected, the method further includes the following steps: determining whether the response includes a speech signal that includes a pre-defined term (e.g., "please leave a message"), and, if it does, determining that the destination is a machine.

Yet another embodiment is a method that includes the following steps: establishing a communication with a destination, detecting a response, if a response is not detected within a pre-determining time interval, determining that the destination is a machine. If a response is detected, the method further includes the following steps: determining whether the response includes a speech signal; if it does not, determining that the destination is a machine; otherwise, analyzing the content of the speech signal using a natural language routing technique designed to return whether the destination is a machine, a live agent, or an unknown by extracting key terms from the speech signal. Thus, the last step of the method is determining the type of the destination based on the result of the analysis.

BRIEF DESCRIPTION OF THE DRAWINGS

The invention will be more fully understood from the following detailed description taken in connection with the accompanying drawings, in which:

FIGS. 7a–b illustrate a combined detection method in accordance with the principles of the invention.

DETAILED DESCRIPTION

Figures 1A, 1B:
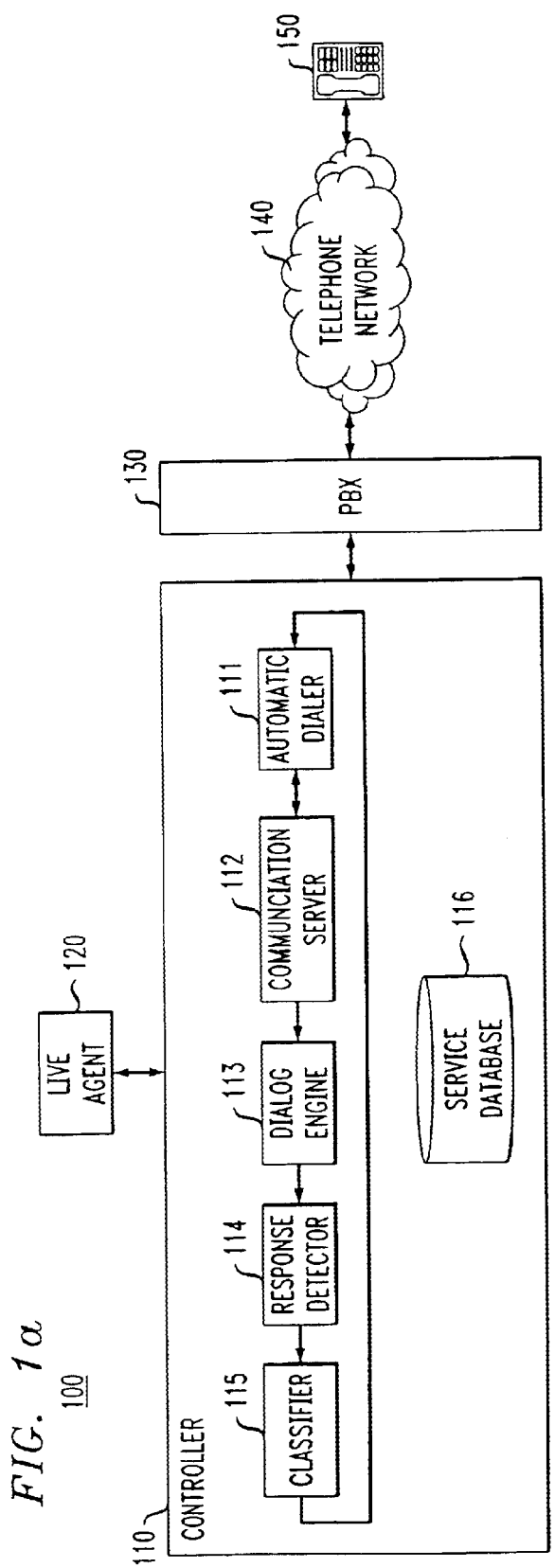
FIGS. 1a–g illustrate a communication management system with a live agent in accordance with the principles of the invention.

FIG. 1a shows an illustrative communication management system 100 in accordance with the principles of the invention. System 100 Includes controller 110, live agent 120, PBX (Private Branch Exchange) 130, communications network 140, and destination 150. Controller 110 establishes a communication with destination 150 using PBX, 130 and communications network 140. Illustratively, PBX 130 is a DEFINITY® Business Communications System (BCS) offered by AVAYA INC., Basking Ridge, N.J., and communications network is a PSTN (Public Switched Telephone Network). Communications network 140 can also be a wireless network, or a data communications network such as the Internet, ATM, or Frame Relay. Destination 150 illustratively is an answering machine that does not generate a tone. Destination 150 can be a live person answering a phone call through a conventional telephone, an answering service provided by a PBX or a central office switch, a computer, or a facsimile machine.

Controller 110 includes automatic dialer 111, communication server 112, dialog engine 113, response detector 114, classifier 115, and service database 116, all under the control of controller 110. Controller 110 is illustratively implemented with a microprocessor such as a MC68360 by MOTOROLA and a digital signal processor (DSP) chip such as a DSP16210 digital signal processor by AGERE SYSTEMS INC. Controller 110 includes controller software for coordinating other components. The DSP is illustratively used to control an on-hook/off-hook switch of a telephone line connected from PBX 130 to communication server 112. The DSP also performs dialing PA functions using either DTMF (dual tone multi-frequency) or dial pulsing under the control of the controller software. The microprocessor, the DSP, the controller software, and the on-hook/off-hook switch are not shown. It should be noted that the communication is between the microprocessor and the DSP (for example, using a dual-port RAM), the control of the on-hook/off-hook switch by the DSP, and the generation of the DTMF and dial pulsing by the DSP are well known in the art and are not described herein.

When controller 110 is powered up, the controller software commands automatic dialer 111 to retrieve destination information from service database 116. As illustrated in the database table in FIG. 1b, the retrieved destination information includes a telephone number associated with the destination. For example, destination 150 in row N1 has a telephone number of 908-696-5198 under column P. The destination information may also include an IP (Internet Protocol) address if the destination can be reached through an IP network.

Figure 1C:
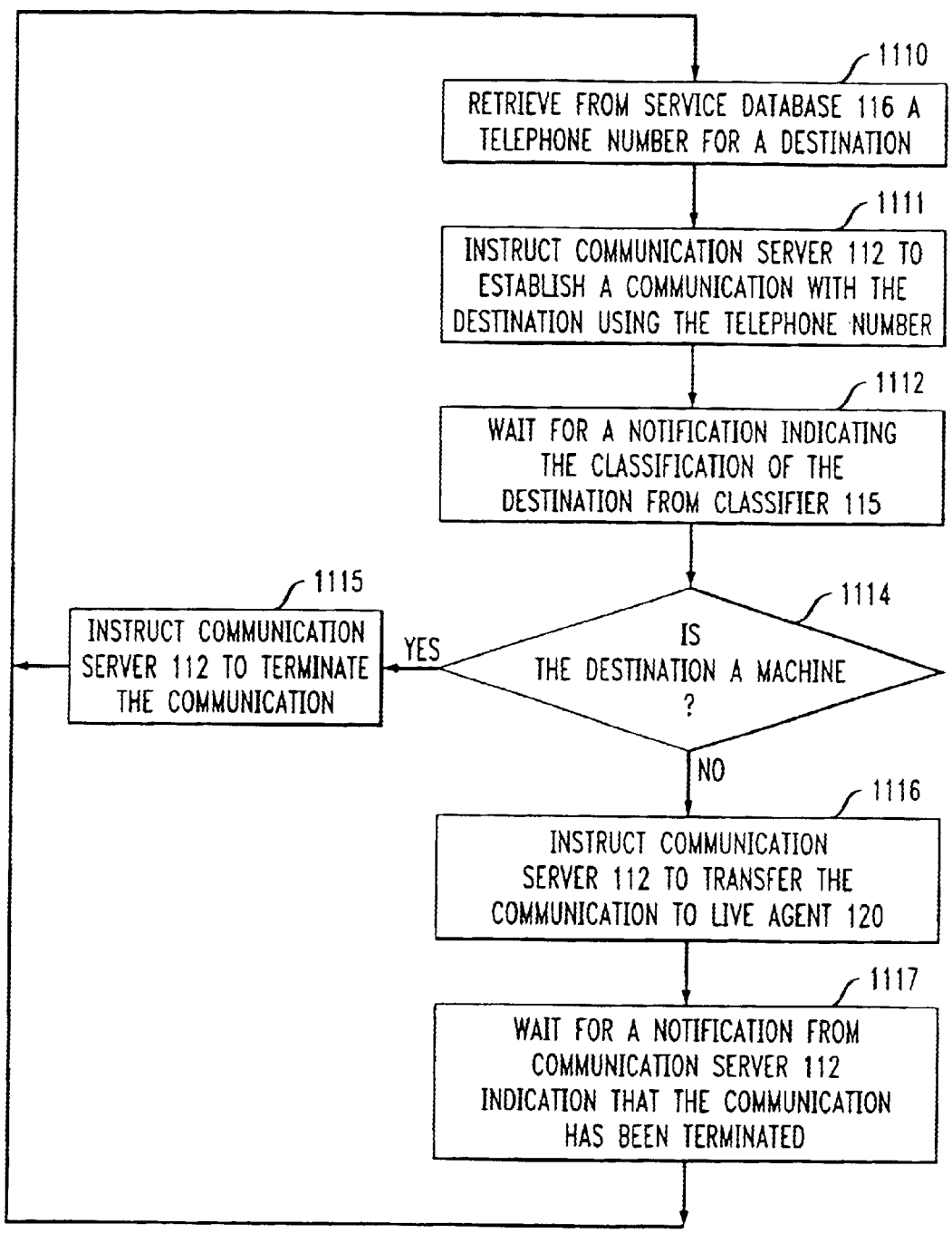

FIG. 1c illustrates the process flow of automatic dialer 111. When controller 110 is powered up, automatic dialer 111 retrieves from service database 116 a telephone number for a destination (step 1110). At step 1111, automatic dialer 111 instructs communication server 112 to establish a communication with the destination using the retrieved telephone number and, then, waits for a notification indicating the classification of the destination from classifier 115. Decision step 1114 transfers the control to step 1115 or 1116 based on whether the destination is a machine. If the destination is a machine, the control is transferred to step 1115 where automatic dialer 111 instructs communication server 112 to terminate the communication with the destination and returns the control to step 1110. Step 1110, then, retrieves a telephone number for another destination. If the destination is not a machine, automatic dialer 111 instructs communication server 112 to transfer the communication to live agent 120 (step 1116) and wait for a notification indicating that the communication has been terminated from communication server 112 (step 1117). Once the notification has been received, automatic dialer 111 returns the control to step 1110 for retrieving a telephone number for another destination. Automatic dialer 111 is illustratively implemented by software running under the microprocessor. Automatic dialer 111 can also be implemented by software running under a different microprocessor or as an application specific integrated circuit (ASIC).

Figure 1D:
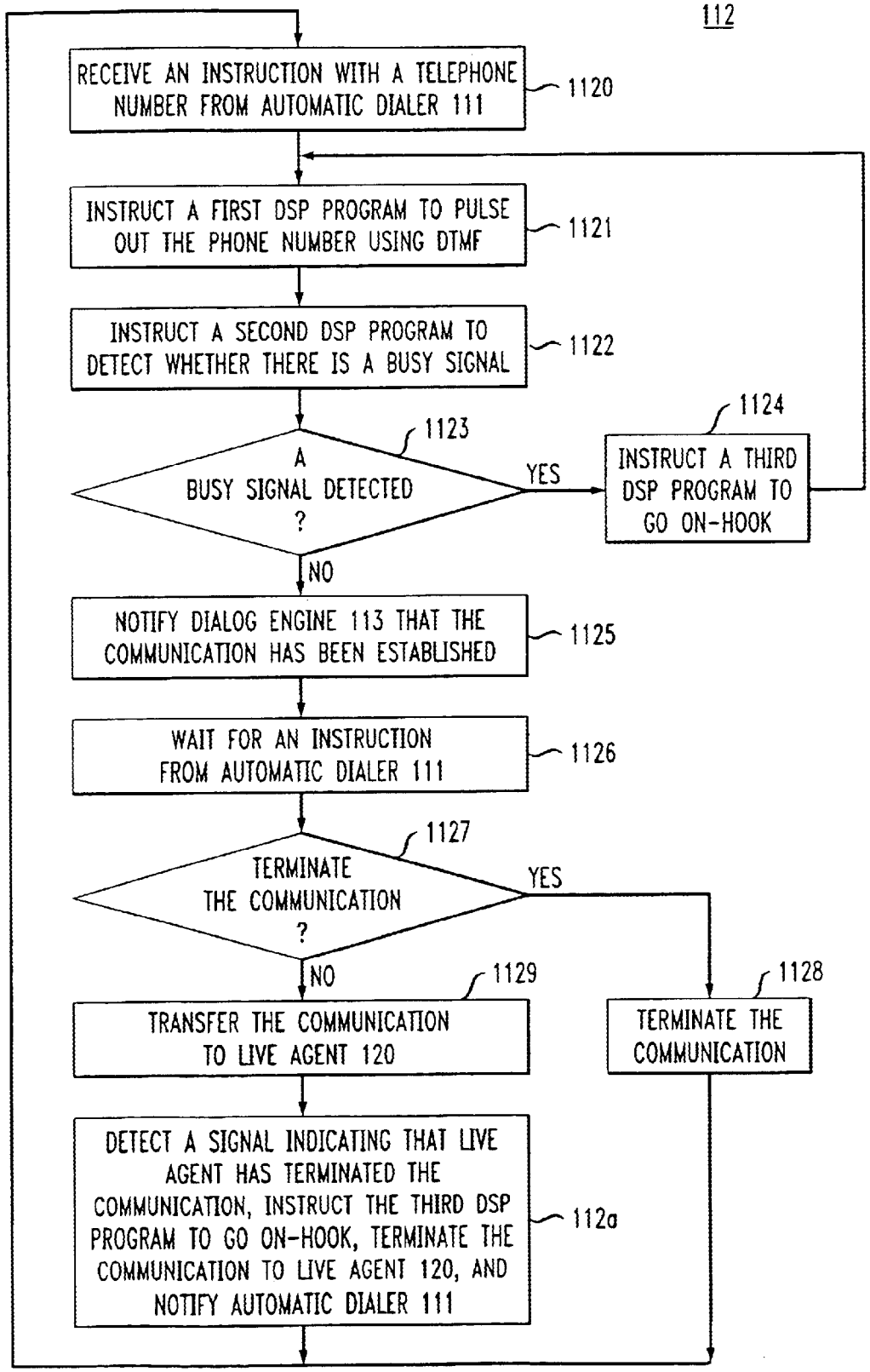

Referring now to FIG. 1d, an illustrative process flow for communication server 112 is shown. At step 1120, communication server 112 receives an instruction with a telephone number from automatic dialer 111 to establish a communication using the telephone number. At step 1121, communication server 112 instructs a first DSP program to pulse out the phone number using DTMF and instructs a second DSP program to detect whether there is a busy signal, at step 1122. Decision step 1123 transfers the control to step 1124 or 1125 based on whether a busy signal is detected. If a busy signal is detected, communication server 112 instructs a third DSP program to go on-hook at step 1124. The process, then, is repeated from step 1121. If no busy signal is detected, the communication has been established through PBX 130 and communications network 140. Thus, when no busy signal is detected, communication server 112 notifies dialog engine 113 that the communication has been established, at step 1125. Communication server 112, then, waits for an instruction from automatic dialer 111. Decision 1127 transfers the control to step 1128 or 1129 based on whether the instruction from automatic dialer 111 is to terminate the communication. If the instruction is to terminate the communication, the control is transferred to step 1128 where communication server 112 terminates the communication and returns the control to step 1120. If the instruction is not to terminate the communication, communication server 112 transfers the communication to live agent 120, at step 1129. At step 112a, communication server 112 monitors the communication until live agent 120 has terminated the communication, instructs the third DSP program to go on-hook, disconnects live agent 120, and notifies automatic dialer that the communication has been terminated. Then, communication server 112 returns the control to step 1120.

Illustratively, communication server 112 includes software programs running under the microprocessor and the DSP in which the DSP generates DTMF tones representing the phone number and sends the DTMF tones to PBX 130 under the control of the microprocessor. Dial pulse dialing can be used as well. Upon receiving the DTMF tones, PBX 130, through communications network 140, establishes the communication with the destination. The communication is established when the destination answers the telephone call by switching to an off-hook position. For illustration purposes, the destination is destination 150, which illustratively is an answering machine which does not generate a tone and plays the following outgoing a message: "please leave a message."

Figure 1E:
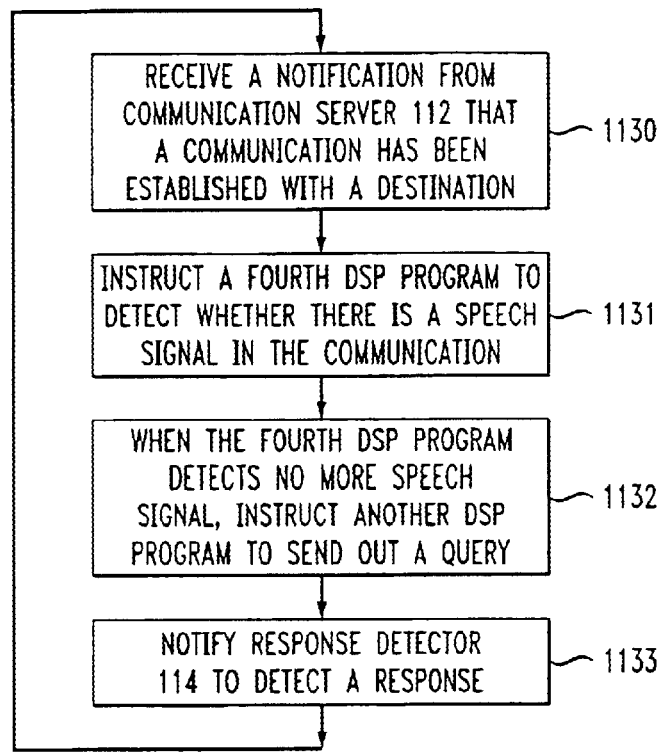

After the communication has been established, communication server 112 notifies dialog engine 113. FIG. 1e illustrates the process of dialog engine 113. At step 1120, dialog engine 113 receives a notification that the communication has been established from communication server 112. At step 1131, dialog engine 113 instructs a fourth DSP program to detect whether there is a speech signal in the communication once the notification has been received. The fourth DSP program ignores any detected speech signals. When the fourth DSP program detects no more speech signal within a pre-determined time interval (for example, 2 seconds), dialog engine 113 sends out a query (step 1132). For illustration purposes, the query is a question in the form of speech such as "may I talk to you?" The query can be any term that invites a response from a live person. Dialog engine 113 then notifies response detector 114 to detect a response, at step 1133, and returns the control to step 1140. Dialog engine 113 is illustratively implemented by software running under the microprocessor and the DSP. Dialog engine 113 can also be software running under a different microprocessor or as an ASIC.

Figure 1F:
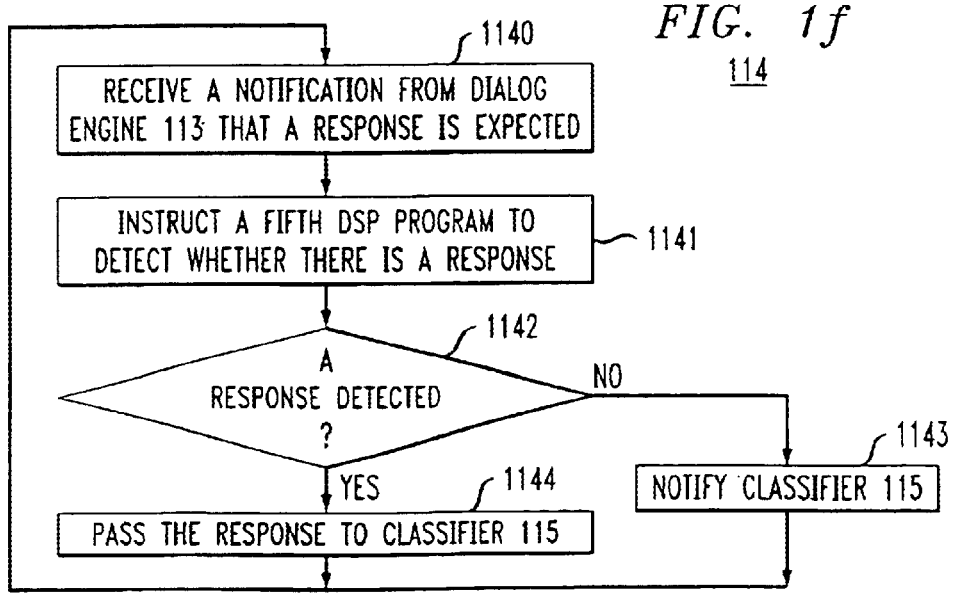

Referring now to FIG. 1f, an illustrative process flow for response detector 114 is shown. After receiving a notification from dialog engine 113 at step 1140, response detector 114 instructs a fifth DSP program to detect whether there is a response from destination 150 within a pre-determined time interval (for example, 2 seconds). Decision step 1142 transfers the control to step 1143 or 1144 based on whether a response has been detected. If response detector 114 does not detect a response in the pre-determined time interval, response detector 114 notifies classifier 115 that no response has been received at step 1143. Otherwise, response detector 114 passes the response to classifier 115 at step 1144. In either case, response detector 114 returns the control to step 1140. For illustration purposes, response detector 114 is a wideband (200 Hz –4,000 Hz) energy detector implemented in the DSP. When the detected energy is above a pre-defined threshold (for example, −35 dBm), response detector 114 determines that a response has been received. Otherwise, response detector 114 decides that no response has been received. It should be noted that the response has been digitized by an AND (Analog-to-Digital) converter (not shown) at response detector 114 and are segmented into frames. Illustratively, the response is digitally sampled at 8 KHz (Kilohertz), such that each frame includes 256 digital samples and corresponds to 30 ms (millisecond) segments of the response.

Figure 1G:
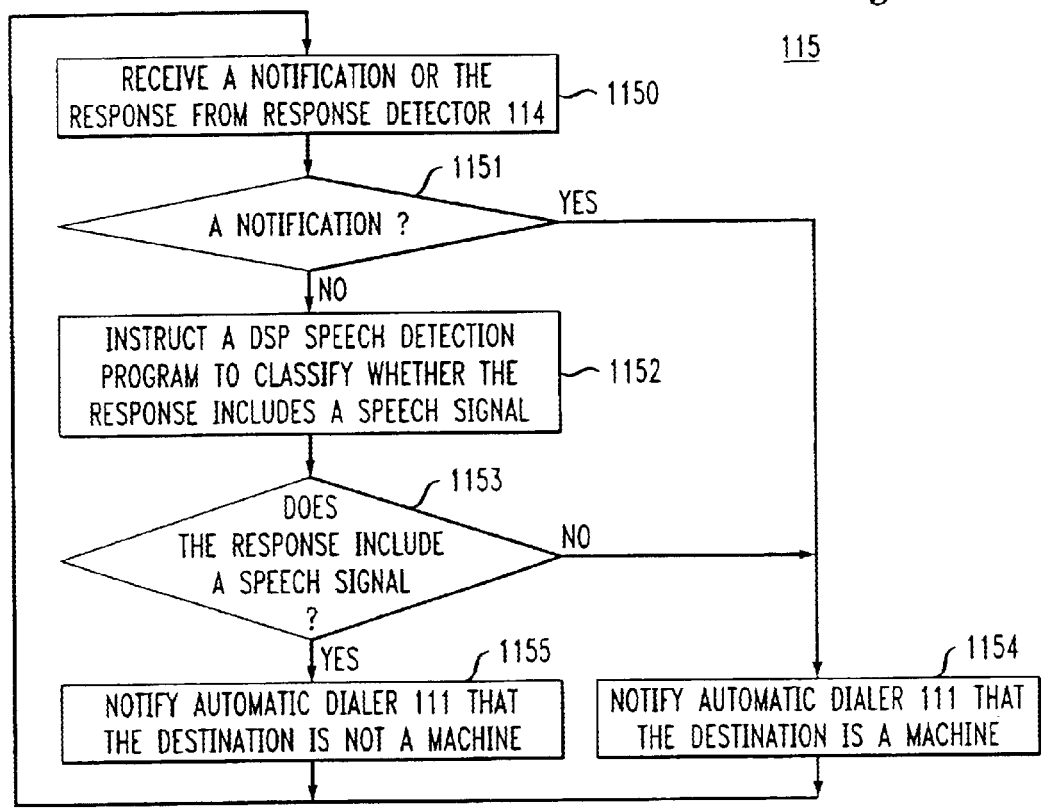

Referring to FIG. 1g, an illustrative process flow of classifier 115 is shown. If a notification is received at step 1150, decision step 1151 transfers the control to step 1154 where classifier 115 notifies automatic dialer 111 that the destination is a machine and returns the control to step 1150. Otherwise, a response has been received, and, at step 1152, classifier 115 instructs a DSP speech detection program to classify whether the response includes a speech signal, i.e., one or more spoken utterances in the response. If the response includes a speech signal, decision step 1153 transfers the control to step 1155 where classifier 115 notifies automatic dialer 111 that the destination 150 is not a machine. Otherwise, classifier 115 notifies automatic dialer 111 that the destination is a machine, at step 1154. In either case, classifier 115 returns the control to step 1150.

Speech generally consists of one or more spoken utterances, each of which may include a single word or a series of closely spaced words forming a phrase or a sentence. In practice, speech detection systems typically determine the endpoints (the beginning and ending points) of a spoken utterance to accurately identify the specific sound data intended for analysis. Speech detection systems generally rely on different kinds of information encapsulated in the speech signal. One approach uses time domain information of the signal. Typically, the intensity or amplitude of the speech signal is measured. Portions of the speech signal having an intensity greater than a minimum threshold are designated as being speech; whereas those portions of the speech signal having an intensity below the threshold are designated as being non-speech. As an example, refer to "A Robust, Real-Time Endpoint Detector with Energy Normalization for ASR in Adverse Environments," by Li, et al., published in International Conference on Acoustic, Speech and Signal Processing, 2001 (ICASSP'2001). In the article, a filter for detecting the endpoints of an utterance is described. A 3-state transition machine for final endpoint decisions using two intensity thresholds then evaluates the output of the filter. As pointed out earlier, the response has been digitized by an A/D converter at response detector 114 and are segmented into frames. A frame should be large enough to provide sufficient data for frequency analysis, and yet small enough to accurately identify the endpoints of an utterance. Illustratively as described earlier, the response is digitally sampled at 8 KHz (Kilohertz), such that each frame includes 256 digital samples and corresponds to 30 ms (millisecond) segments of the response.

It should be noted a speech signal is one of the features that can be included in a response. Other features such as tones generated by a machine can be included as well, but those features should be determined by classifier 115 as non-speech. Illustratively classifier 114 is software running under both the microprocessor and the DSP, but it can be software running under a different microprocessor or as an ASIC.

It should be noted that more than one copy of communication server 112 can be included in the system or that communication server 112 can establish more than one communication at a time, so that more than one destination can be contacted. Similarly, more than one copy of dialog engine 113, response detector 114, and classifier 115 can be included in the system to improve the response time.

Figure 2:
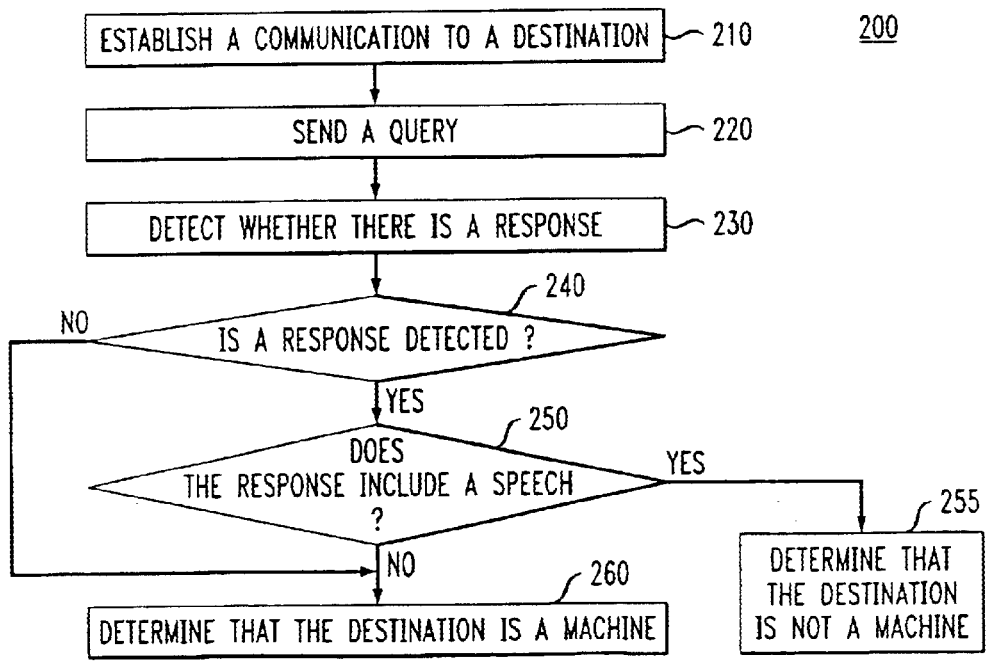
FIG. 2 illustrates a dialog detection method in accordance with the principle of the invention.

Referring to FIG. 2, an exemplary method using a dialog engine in accordance with the principles of the invention for detecting whether a destination is a machine is shown. At step 210, a communication is established with a destination. At step 220, a query is sent to the destination. The query is a term that invites a response from a live person. Step 220 detects whether there is a response from the destination within a predefined time interval (for example, 3 seconds). Examples of the term are "may I talk to you?", "how are you today?", and "this is so and so, whom am I speaking to?" The query is sent when the destination is silent or when there is no human speech present from the destination. If a response has been detected, decision step 240 transfers the control to decision step 250 which transfers the control to step 255 or 260 based on whether the response includes a speech signal. If there is no response detected or the response does not include a speech signal, at step 260, the destination is identified as a machine. Otherwise, the destination is determined to be not a machine at step 255. It is observed that, unlike a live person, an answering machine should not be able to engage in a meaningful dialog.

It should be noted that if a response is not detected at step 240, method 200 can return the control to step 220 for one or more tries to reduce the chance of misidentification. Similarly, if a response has been received but the response does not include a speech signal, method 200 can also return the control to step 220 for one or more tries. The content of a query can be different for each try.

Figure 3A:
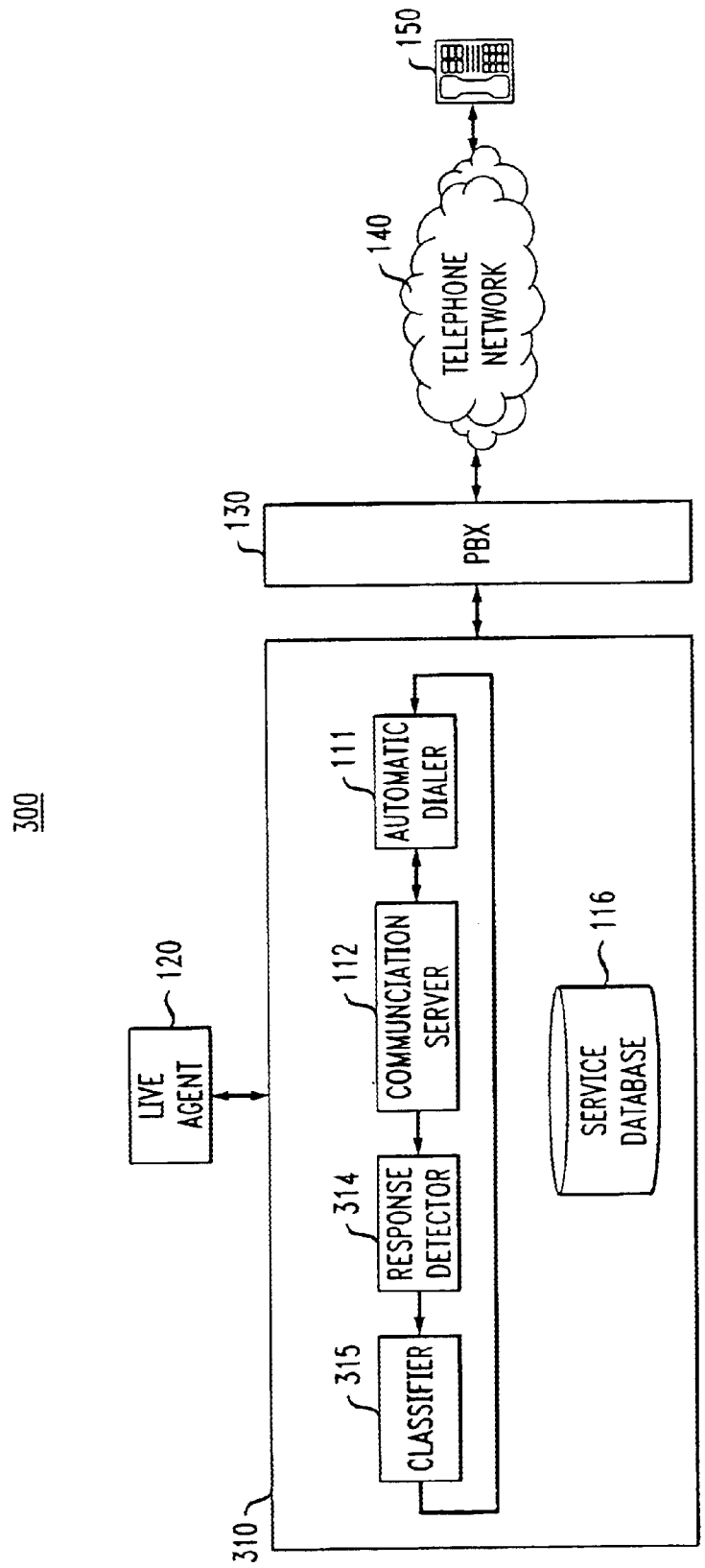
FIGS. 3a–c illustrate another communication management system with a live i=agent in accordance with the principles of the invention.

Referring to FIG. 3*a*, another illustrative communication management in accordance with the principles of the invention is shown. System 300 is similar to system 100 except that system 300 does not have a dialog engine. Response detector 314 not only detects the presence of a response but also forwards each portion of the response that it receives to classifier 315. Classifier 315 uses different techniques for classifying a destination as a machine or not a machine. The common components are labeled the same as in FIG. 1*a*.

After the communication has been established by communication server 112, response detector 314 should detect a response within a second pre-determined time interval (for example, 3 seconds). If a response is detected, response detector 314 forwards each portion of the response it receives to classifier 315. Each portion is illustratively a frame which is 256 samples.

Figure 3B:
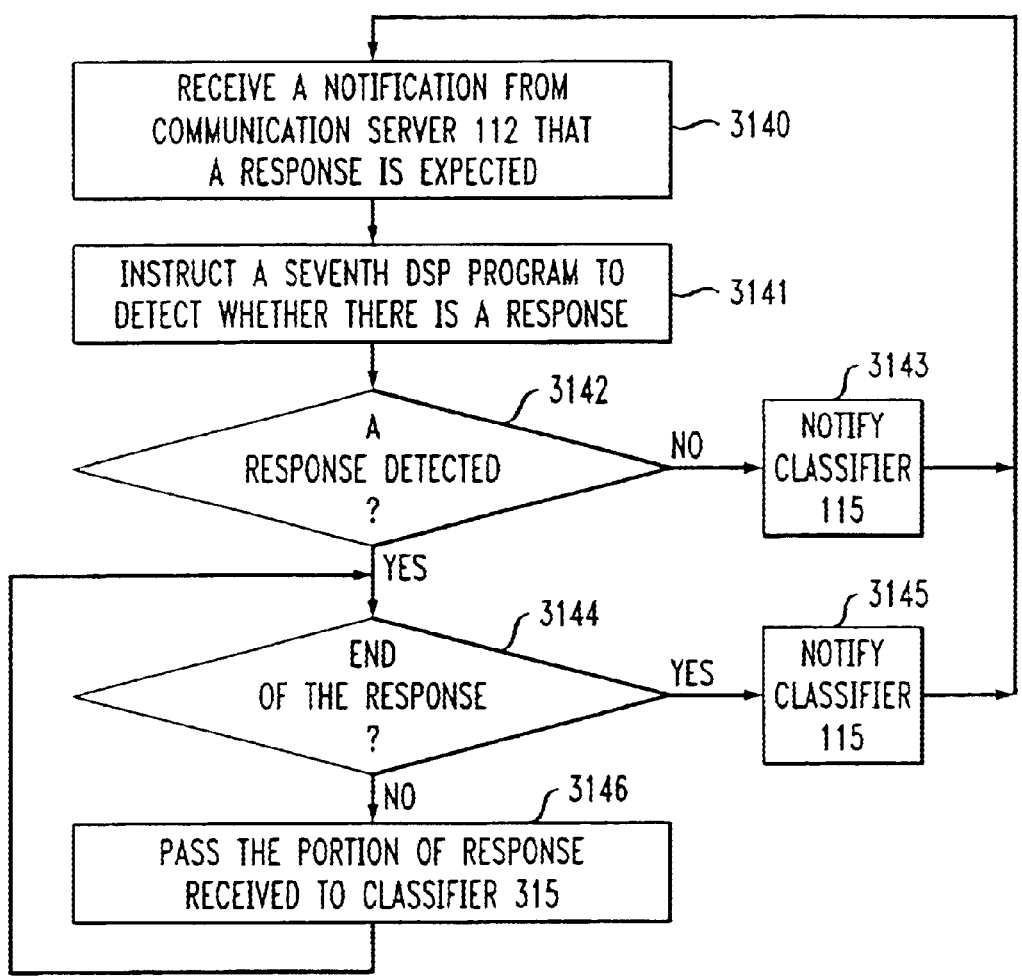

FIG. 3*b* illustrates the process flow of response detector 314. After receiving a notification from communication server at step 3140, response detector 314 instructs a seventh DSP program to detect whether there is a response within a pre-determined time interval (for example, 2 seconds). Decision step 3142 transfers the control to step 3143 if a response is not detected. At step 3143, response detector 314 notifies classifier 115 that no response has been received and returns the control to step 3140. If a response is detected, decision step 3142 transfers the control to decision step 3144. Decision step 3144 continues to transfer the control to step 3146 where the received portion is passed to classifier 315. When the complete response has been received, decision step 3144 transfers the control to step 3145 where response detector 314 notifies classifier 315 that a complete response has been passed and returns the control to step 3140.

Figure 3C:
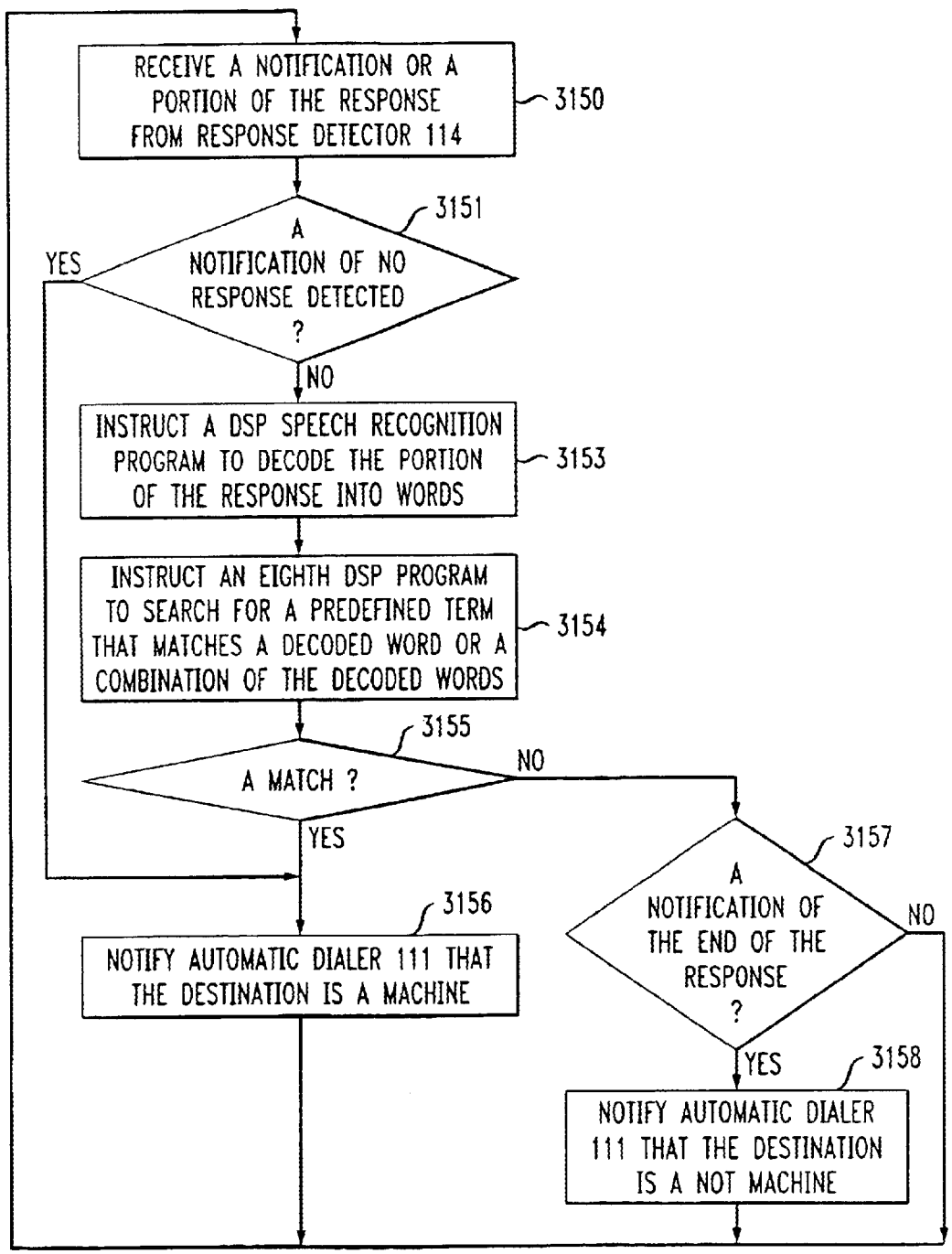

FIG. 3*c* illustrates the process flow of classifier 315. At step 3150, classifier 315 receives a notification indicating that no response has been received, a notification indicating a complete response has been received, or a portion of a response. If a notification indicating that no response has been received is received, decision step 3151 transfers the control to step 3156. At step 3156, classifier 315 notifies automatic dialer 111 that the destination is a machine. If a notification indicating that a complete response has been received is received, decision step 3151 transfers the control to step 3153 where classifier 315 instructs a DSP speech recognition program to decode the received portion of the response into words. Classifier 315 then instructs an eighth DSP program to search for a predefined term that matches a word or a combination of words decoded from the received portion of the response, at step 3154. If there is a match, decision step 3155 transfers the control to step 3156 where classifier 315 notifies automatic dialer 111 that the destination is a machine and returns the control to step 3150. If there is no match and a notification indicating that a complete response has been received is received, decision step 3157 transfers the control to step 3158 where classifier 315 notifies automatic dialer 111 that the destination is not a machine. Otherwise, decision step 3157 transfers the control back to step 3150.

Generally, speech recognition is performed by comparing the features of an unknown utterance to the features of known words or word strings. The features of known words or word strings are determined with a process known as "training." Through training, one or more samples of known words or strings (training speech) are examined and their features (or characteristics) recorded as reference patterns (or recognition models) in a database of a speech recognizer. Typically, each recognition model represents a single known word. However, recognition models may be thought of as building blocks for words and strings of words, such as phases or sentences. The features of unknown utterance are extracted and then the features are compared to each model in the database. A scoring technique is used to provide a relative measure of how well each model matches the unknown utterance. The unknown utterance is recognized as the words associated with the combination of one or more models which most closely matches the unknown utterance. As an example, refer to "Automatic Speech and Speaker Recognition," edited by C. -H. Lee, F. K. Soong and K. K. Paliwal, Kluwer, Academic Publishers, 1996.

Here, each word or a combination of words decoded from the received portion of the response is compared to a set of predefined (known and trained) terms. A term can be a word, a phase, or a sentence. Illustratively, the predefined terms include terms that indicate that the speech is not from a live person speaking through the communication. Examples of the predefined terms are "bye," "message," "beep," "please leave a message," "leave a message," "not home," "I am not home," "call back later," and "you know what to do." The characteristics of these terms are illustratively stored in database 116 and is loaded into the memory (not shown) of the DSP.

As described previously, when notified by classifier 115 that the destination is a machine, automatic dialer 111 instructs communication server 112 to terminate the communication. Otherwise, if notified by classifier 115 that the destination is not a machine, automatic dialer 111 instructs communication server 112 to connect the communication to live agent 120 as described previously with respect to system 100. It should be noted that the advantage of passing a portion of a response to classifier 115 is that a pre-defined term may be found before the complete response has been received. Thus, the destination can be terminated earlier. Response detector 314 may also wait until the complete response has been received and pass the complete response to classifier 315 as in method 200 but the average processing time may be longer.

Figures 4, 5:
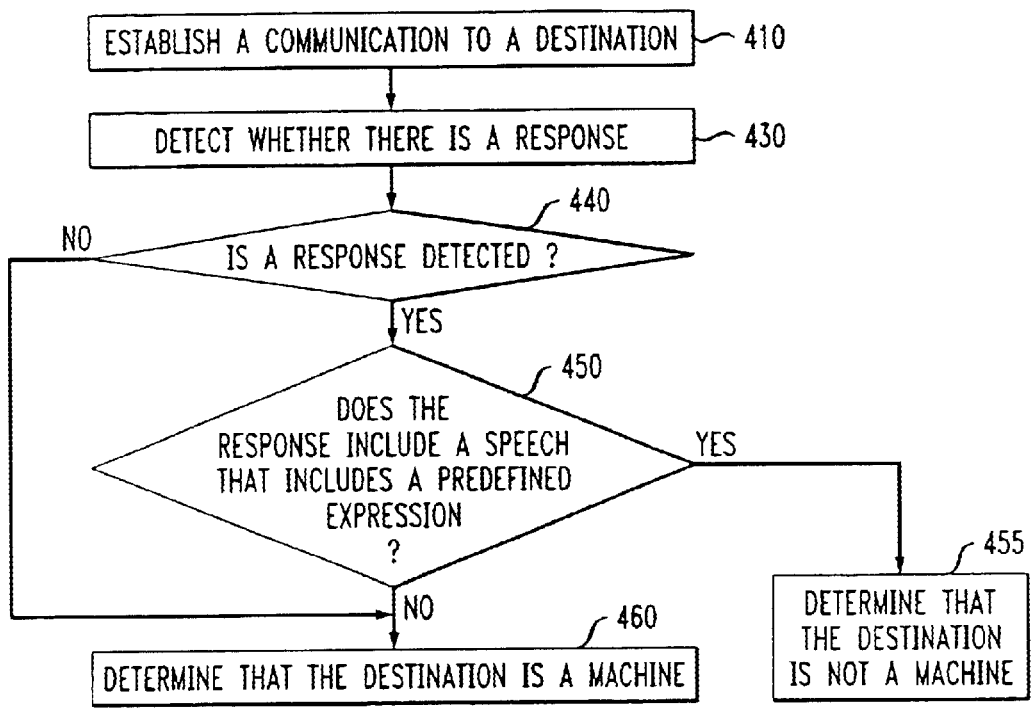
FIG. 4 illustrates a pre-defined term detection method in accordance with the principles of the invention.
FIG. 5 illustrates a term-destination table used in a content analysis of a speech signal in accordance with the principles of the invention.

Referring now to FIG. 4, an exemplary method for identifying whether a destination is a machine by detecting a pre-defined term in a response is shown. After the communication has been established at step 410, step 430 detects whether there is a response from the destination. Decision step 440 transfers the control to decision step 450 if a response has been detected. Decision step 450 then forwards the control to step 455 or 460 based on whether the response includes a speech signal that includes a predefined term. If the response does not include a speech signal, or the response includes a speech signal that does not include a predefined term, or no response is detected, the control is transferred to step 460 which determines that the destination is a machine. Otherwise, the control is transferred to step 455 which determines that the destination is not a machine. As discussed previously, although preferred, steps 440 and 450 do not require the complete response. If no match is found, these two steps are repeated until the complete response has been analyzed.

An extension of method 400 is the use of content analysis of the speech included in a response from the destination for determining whether a destination is a machine. Illustratively, it is observed that the natural language routing technique can be extended id, for determining whether a destination is a machine. Here, frequently used outgoing messages from answering machines, and frequently used terms for a live person in answering a phone call are analyzed and key terms are extracted. For each key term, the frequencies of use by a machine and a live person are recorded. For example, in the term-destination table in FIG. 5, the number of use of the term "leave" at row R1 by a machine (column C1) is 60 and by a live person (column C2) is 0. For convenience, the columns (C1 and C2) for a machine and a live person are respectively called machine and live person vectors. When the response is received and the response includes a speech signal, a response vector with the same row elements are formed. The response vector is formed as follows: if a term in the term-destination table is included in the response, the corresponding element in the response vector is illustratively marked as 1; otherwise, it is illustratively marked as 0. Different values may be assigned as long as the value assigned to a term present in the term-destination table is larger than that assigned to a term absent in the table. A scoring technique is used to provide a relative measure of how well each column vector is associated with the response vector. The column with its vector more closely matches the response vector is identified as the type of the destination.

Illustratively, the score is computed by a cosine between the response vector and a column vector. Assuming that each vector has n elements and denoting the response vector as $R = <r_1, r_2, \ldots, r_n>$ and a column vector as $C = <c_1, c_2, \ldots, c_n>$, the cosine between these two vectors is given by:

$$\cos(R,C) = (R * C^T)/(\|R\| \cdot \|C\|)^{1/2}$$

where $\|R\|$ and $\|C\|$ are the lengths of vectors R and C, respectively. The length of a vector X is defined as:

$$\|X\| = (X \cdot X^T)^{1/2} = (\Sigma_{1 \le i \le n} x_i^2)^{1/2}$$

The closer the two vectors, the closer the cosine approaching to 1. For example, if the message, "please leave a message", is in the response, $R = <1, 1, 1, 0, 0, 0>$. The cosine of R and the machine vector, which is $<60, 54, 70, 1, 0, 75>$, is about 0.814; whereas the cosine of R and the life person vector, which is $<0, 0, 0, 80, 85, 5>$, is 0. Thus, the destination is identified as a machine. However, if both scores are smaller than a threshold (for example, 0.1), the destination is identified as an unknown. Illustratively, the term-destination table is stored in a database such as database 116 or 316. It should be noted that a tone or other features can be a term in a term-destination table as well. For example, a beep is a term in an outgoing message if the outgoing message ends with a beep.

Figure 6:
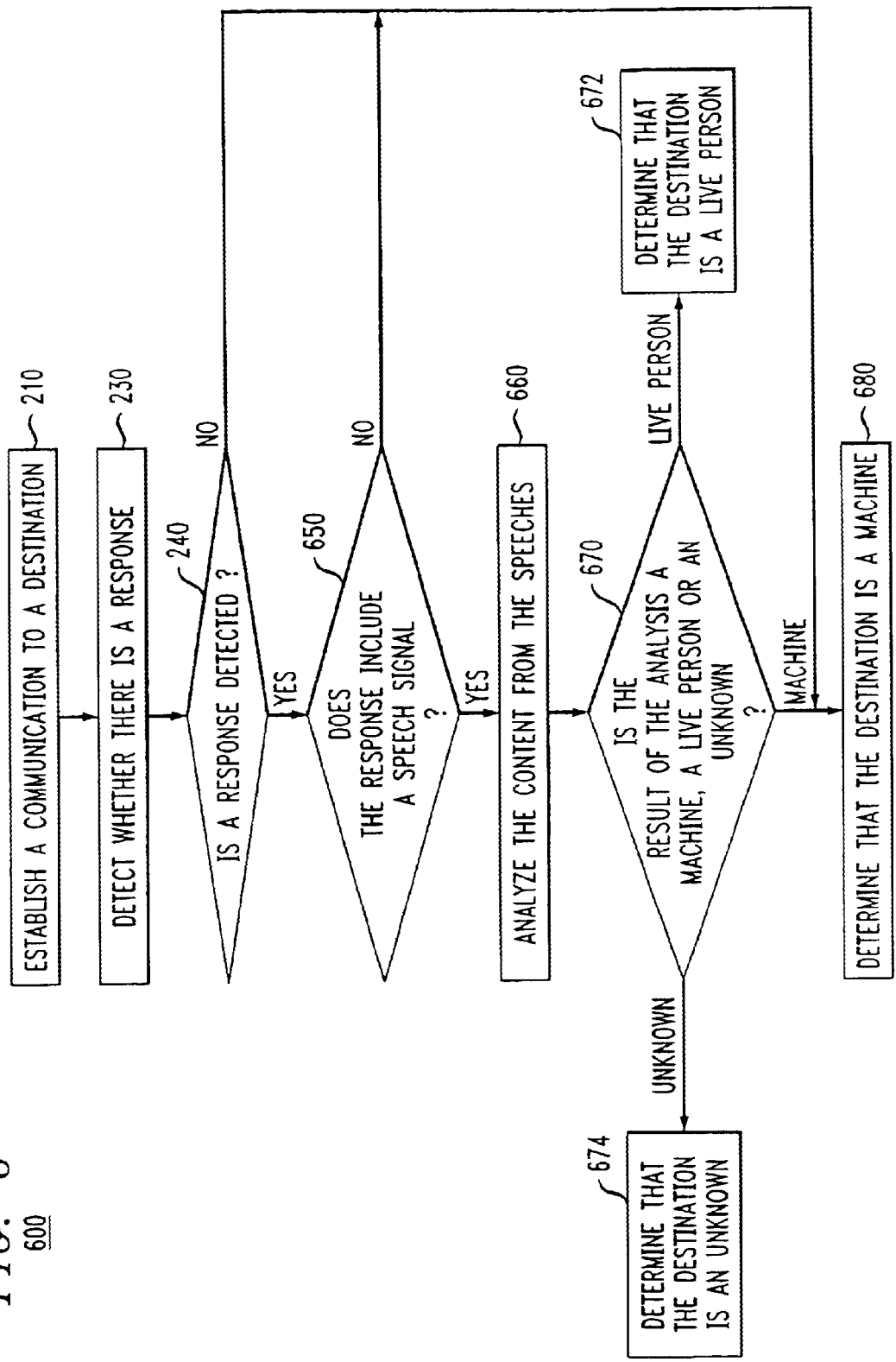
FIG. 6 illustrates a content analysis detection method in accordance with the principles of the invention.

FIG. 6 illustrates a method for determining whether a destination is a machine by analyzing the content of the speech in a response described above. In FIG. 6, steps 210, 230, and 240 are the same as in FIG. 2. Step 650 transfers the control to steps 660 or 680 based on whether the response includes a speech signal. If the response does not include a speech signal, the control is transferred to step 680, where the destination is determined as a machine. If there is a speech signal, the content of the speech signal is analyzed at step 660 by using the method described above. Decision step 670 respectively transfers the control to steps 680, 672, and 674 if the result of the analysis is a machine, a live person, or an unknown. Steps 680, 672, and 674, then, declare the respective result, associated with the response vector. The column with its vector more closely matches the response vector is identified as the type of the destination.

Illustratively, the score is computed by a cosine between the response vector and a column vector. Assuming that each vector has n elements and denoting the response vector as $R = <r_1, r_2, \ldots, r_n>$ and a column vector as $C = <c_1, c_2, \ldots, c_n>$, the cosine between these two vectors is given by:

$$\cos(R,C) = (R * C^T)/(\|R\| \cdot \|C\|)^{1/2}$$

where $\|R\|$ and $\|C\|$ are the lengths of vectors R and C, respectively. The length of a vector X is defined as:

$$\|X\| = (X \cdot X^T)^{1/2} = (\Sigma_{1 \le i \le n} x_i^2)^{1/2}$$

The closer the two vectors, the closer the cosine approaching to 1. For example, if the message, "please leave a message", is in the response, $R = <1, 1, 1, 0, 0, 0>$. The cosine of R and the machine vector, which is $<60, 54, 70, 1, 0, 75>$, is about 0.814; whereas the cosine of R and the life person vector, which is $<0, 0, 0, 80, 85, 5>$, is 0. Thus, the destination is identified as a machine. However, if both scores are smaller than a threshold (for example, 0.1), the destination is identified as an unknown. Illustratively, the term-destination table is stored in a database such as database 116 or 316. It should be noted that a tone or other features can be a term in a term-destination table as well. For example, a beep is a term in an outgoing message if the outgoing message ends with a beep.

FIG. 6 illustrates a method for determining whether a destination is a machine by analyzing the content of the speech in a response described above. In FIG. 6, steps 210, 230, and 240 are the same as in FIG. 2. Step 650 transfers the control to steps 660 or 680 based on whether the response includes a speech signal. If the response does not include a speech signal, the control is transferred to step 680, where the destination is determined as a machine. If there is a speech signal, the content of the speech signal is analyzed at step 660 by using the method described above. Decision step 670 respectively transfers the control to steps 680, 672, and 674 if the result of the analysis is a machine, a live person, or an unknown. Steps 680, 672, and 674, then, declare the respective result.

If method 200 is combined with method 600, the scope of the search for a match is reduced because there are limited possible responses to a known query. For example, if the query is "hello, how may I direct your call?" from a car loan service, a possible response is "I need car loan." The combined method creates a different term-destination table for each query and, for each query, the combined method only searches for the corresponding term-destination table.

It should be noted that method 200 can be preceded by either method 400 or 600, or both. For example, at step 450 of method 400, if the response includes a speech signal but the speech signal does not include a predefined term, rather than declaring that the destination is a machine, the method can transfer the control to step 220 for further analysis. Similarly, if method 600 cannot decide whether the destination is a machine or a live person, rather than ending the process at step 680, it can transfer the control to step 220 for further analysis.

In a similar manner, method 400 can precede method 600. For example, if the response includes a speech signal but the speech signal does not include a predefined term at 450, rather than declaring that the destination is a machine, step 450 can pass the complete response to step 660 of method 600 for further analysis.

Furthermore, all the methods can be preceded by a tone detection as done in the prior art. For example, if no tone is detected, at least one of methods 200, 400, and 600 can be used for further analysis.

Figure 7B:
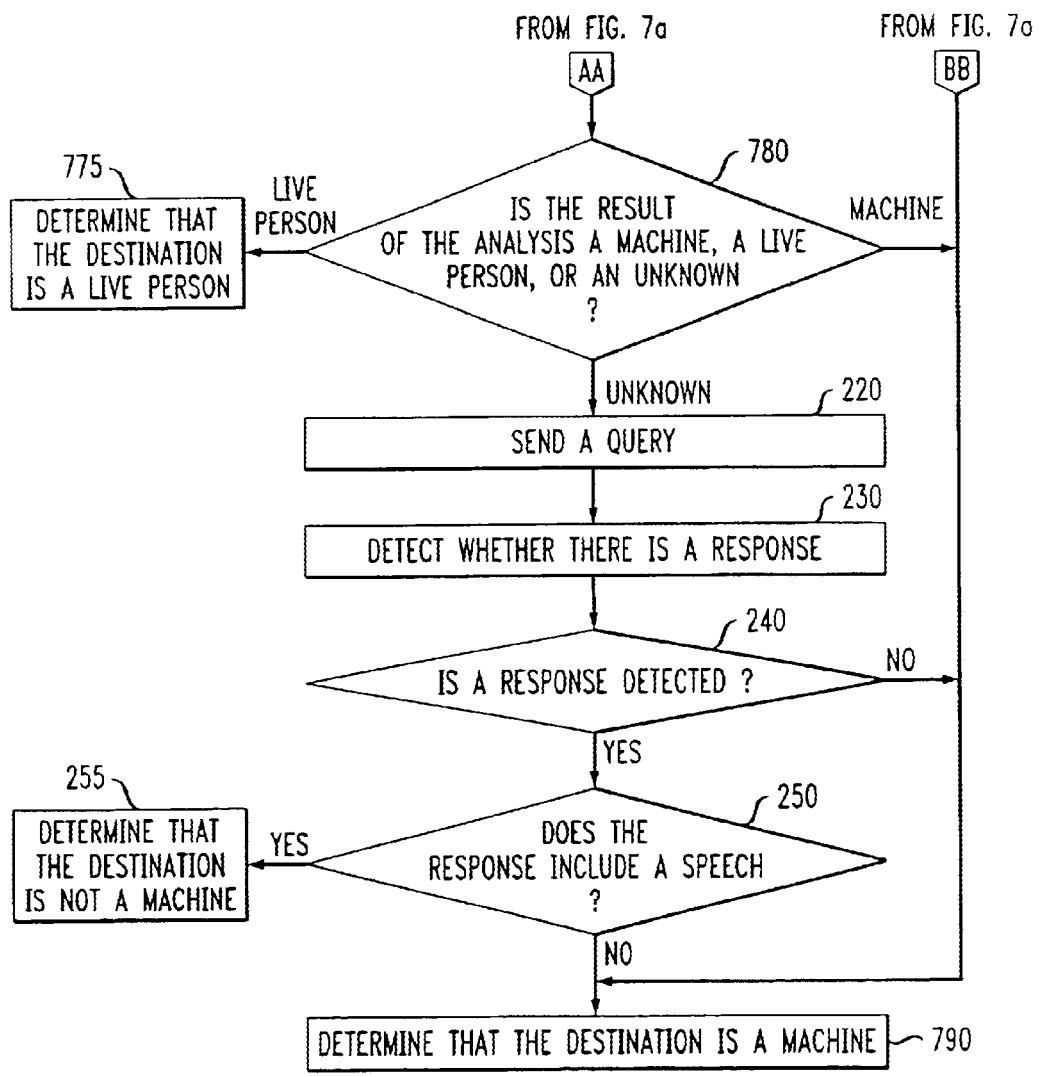

FIGS. 7a–b show an example of combining conventional tone detection technique with methods 400, 600, and 200, for determining whether a destination is a machine. Steps 210, 230, and 240 have been described in FIG. 2 and are not repeated here. When a response has been detected, step 240 forwards the control to step 750 which decides whether a tone is included in the response. If a tone is detected, method 700 determines that the destination is a machine. Otherwise, the control is passed to step 760 for determining whether the response includes a speech signal that contains a predefined term. If the response includes a speech signal containing a predefined term, method 700 determines that the destination is a machine. If the response includes a speech signal but does not include a predefined term, the content of the speech is analyzed at step 770. Decision block 780 forwards the control to blocks 775, 220, and 790 according to the results of the analysis. If the result is a machine or a live person, method 700 determines that the destination is the same at blocks 790 and 775, respectively. However, if the result is an unknown, a query is sent at step 220. Steps 220, 230, 240, 250, and 255 perform similar functions as in FIG. 2 and are not described here.

It should be noted that when a method has decided that a destination is a live person, an automatic dialing system may send out a query to invite an oral response from the live person. If a response is detected, the automatic dialing system, then, analyzes the content of the oral response using illustratively the term-destination tables described above. To reduce the search time, each query is associated with only one term-destination table. The analysis illustratively determines whether the live person has the intent to continue the dialog. If the result indicates that there is no intent, the automatic dialing system terminates the communication. For example, if the query is "are you interested in buying a car?" and the response is "no," the automatic dialer should terminate the call.

In accordance with the invention, method and apparatus for detecting whether a ail destination is a machine are described. Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure and the procedure may be varied substantially without departing from the spirit of the invention and the exclusive use of all modifications which come within the scope of the appended claim is reserved.

What is claimed is:

1. A method for use in a communications network, the method comprising the steps of:

providing a communication to a destination via a communication server;

detecting in a response detector whether there is a first response from the destination; and determining in a classifier if the destination is a machine based on whether the first response is detected and whether at least one feature other than a tone is present in the first response;

wherein the at least one feature comprises at least one predefined term of speech.

2. The method of claim 1, wherein if the first response is not detected, the determining step indicates that the destination is a machine.

3. The method of claim 1, further comprising the step of sending a query to the destination after the providing step.

4. The method of claim 3, wherein the feature is a speech signal.

5. The method of claim 4, wherein if no speech is present, the determining step indicates that the destination is a machine.

6. The method of claim 5, wherein if a speech signal is present, the determining step indicates that the destination is not a machine.

7. The method of claim 1, wherein the feature is a speech signal that comprises the predefined term.

8. The method of claim 7, wherein if the feature is present, the determining step indicates that the destination is a machine.

9. The method of claim 1, wherein the feature is a speech signal in the first response.

10. The method of claim 1, wherein the determining step comprises searching for the tone and if the tone is not present, searching for other features.

11. A method for use in a communications network, the method comprising the steps of:

providing a communication to a destination via a communication server;

detecting in a response detector whether there is a first response from the destination; and determining in a classifier if the destination is a machine based on whether the first response is detected and whether at least one feature other than a tone is present in the first response;

wherein the feature is a speech signal that comprises a predefined term selected from the group consisting of a word, a phrase, and a sentence.

12. A method for use in a communications network, the method comprising the steps of:

providing a communication to a destination;

detecting whether there is a first response from the destination; and determining if the destination is a machine based on whether the first response is detected and whether at least one feature other than a tone is present in the first response;

wherein the feature is a speech signal in the first response and the determining step further comprises the step of analyzing the feature using a natural language routing technique and deciding the destination as one selected from the group of a machine, a live person, and an unknown, wherein the natural language routing technique is trained with a set of predefined possible responses from the destination.

13. A method for use in a communications network, the method comprising the steps of:

providing a communication to a destination via a communication server;
detecting in a response detector whether there is a first response from the destination; and
determining in a classifier if the destination is a machine based on whether the first response is detected and whether at least one feature other than a tone is present in the first response;
wherein the determining step further comprises the steps of:
if the feature is not present, sending a query to the destination; and
detecting whether there is a second response from the destination; and
if the second response is detected, searching for a speech signal in the second response.

14. A method for use in a communications network, the method comprising the steps of:
providing a communication to a destination;
detecting whether there is a first response from the destination; and
determining if the destination is a machine based on whether the first response is detected and whether at least one feature other than a tone is present in the first response;
wherein the determining step further comprises the steps of:
if the feature is not present, sending a query to the destination;
detecting whether there is a second response from the destination;
if the second response is detected searching for a speech signal in the second response; and
if the second response is not detected, determining that the destination is a machine.

15. A method for use in a communications network, the method comprising the steps of:
providing a communication to a destination;
detecting whether there is a first response from the destination; and
determining if the destination is a machine based on whether the first response is detected and whether at least one feature other than a tone is present in the first response;
wherein the determining step further comprises the steps of:
if the feature is not present, sending a query to the destination; detecting whether there is a second response from the destination;
if the second response is detected, searching for a speech signal in the second response; and
if the speech signal is not present in the second response, determining that the destination is a machine.

16. A method for use in a communications network, the method comprising the steps of:
providing a communication to a destination via a communication server;
detecting in a response detector whether there is a first response from the destination; and
determining in a classifier if the destination is a machine based on whether the first response is detected and whether at least one feature other than a tone is present in the first response;
wherein the determining step comprises searching for the tone and if the tone is not present, the determining step comprises searching for a predefined term.

17. A method for use in a communications network, the method comprising the steps of:
providing a communication to a destination;
detecting whether there is a first response from the destination; and
determining if the destination is a machine based on whether the first response is detected and whether at least one feature other than a tone is present in the first response;
wherein the determining step comprises searching for the tone and if the tone is not present, the determining step comprises searching for a predefined term; and
wherein if no predefined term is present, the determining step comprises analyzing the speech signal using a natural language routing technique to produce a result which is selected from the group of machine, a live person, and an unknown.

18. The method of claim 17, wherein if the result is an unknown, the determining step sends a query to the destination, detects a second response, and determines if the second response comprises a speech signal, and if the second response comprises a speech signal, determines that the destination is not a machine.

19. An apparatus for use in a communications network, the apparatus comprising:
a communication server for providing a communication to a destination using an address of the destination;
a response detector for detecting whether there is a response from the destination; and
a classifier for determining whether the destination is a machine based on whether the response is detected and whether at least one feature in the first response is present, wherein the at least one feature comprises at least one predefined term of speech.

20. The apparatus of claim 19, wherein if the response is not detected, the classifier determines that the destination is a machine.

21. The apparatus of claim 19, further comprising a dialog engine for sending a query to the destination.

22. The apparatus of claim 21, wherein the query dialog sends the query before the detector is activated to detect the first response.

23. The apparatus of claim 22, wherein the feature is a speech signal and if the speech signal is not present the classifier determines that the destination is a machine.

24. The apparatus of claim 19 further comprising:
a service database for storing the address of the destination; and
an automatic dialer for retrieving the address of the destination from the service database.

25. A method for use in a communications network, the method comprising the steps of:
(a) providing a communication to a destination via a communication server;
(b) listening for a first response within a first predetermined interval and ignoring the first response if detected;
(c) sending a query in the form of speech;
(d) detecting in a response detector whether there is a second response within a second pre-determined interval; and
(e) if no second response is detected, determining in a classifier that the destination is a machine.

26. The method of claim 25, wherein at the end of step (e), repeat from step (c).

27. The method of claim 25, further comprising the steps of
(f) if the second response is detected, determining whether the second response includes comprises a speech signal; and
(g) if the second response does not comprise a speech signal, determining that the destination is a machine.

28. The method of claim 27, further comprising the step of
(h) if the second response comprises a speech signal, analyzing the content of the speech signal in the second response to determine whether the destination has an intent to continue the dialog.

29. A method for use in a communications network, the method comprising the steps of:
(a) providing a communication to a destination via a communication server;
(b) detecting in a response detector for a first response within a first pre-determined interval;
(c) if the first response comprises a tone feature, determining in a classifier that the destination is a machine; and
(d) if the first response comprises a speech signal having a predefined term determining in the classifier the type of destination based on the predefined term.

30. The method of claim 29, wherein at step (d) the destination is determined a machine.

31. A method for use in a communications network, the method comprising the steps of:
(a) providing a communication to a destination via a communication server;
(b) detecting in a response detector for a first response within a first pre-determined interval;
(c) if the first response comprises a tone feature, determining in a classifier that the destination is a machine;
(d) if the first response comprises a speech signal, analyzing the content of the speech signal; and
(e) determining in the classifier the type of destination based on the result of the analysis.

32. The method of claim 31, wherein at step (d) the method of analysis is a natural language routing technique.

33. The method of claim 31, wherein at step (e) the result is a selected one of a machine, a live person, and an unknown.

* * * * *

UNITED STATES PATENT AND TRADEMARK OFFICE
CERTIFICATE OF CORRECTION

PATENT NO. : 6,850,602 B1
DATED : February 1, 2005
INVENTOR(S) : Wu Chou

It is certified that error appears in the above-identified patent and that said Letters Patent is hereby corrected as shown below:

Column 13,
Line 12, delete "and".
Line 32, after the word "detected", insert -- , --.
Line 48, "detecting whether there is a second response from the destination;" should start on line 49.

Column 15,
Line 4, delete "includes".

Signed and Sealed this

Third Day of May, 2005

JON W. DUDAS
*Director of the United States Patent and Trademark Office*